United States Patent
Swaminathan et al.

(10) Patent No.: US 10,880,357 B2
(45) Date of Patent: Dec. 29, 2020

(54) REDUCING REQUESTS FOR MEDIA SEGMENTS IN STREAMING OF MULTIMEDIA CONTENT

(71) Applicant: ADOBE INC., San Jose, CA (US)

(72) Inventors: Viswanathan Swaminathan, Saratoga, CA (US); Sheng Wei, San Jose, CA (US)

(73) Assignee: Adobe Inc., San Jose, CA (US)

( * ) Notice: Subject to any disclaimer, the term of this patent is extended or adjusted under 35 U.S.C. 154(b) by 175 days.

(21) Appl. No.: 14/581,916

(22) Filed: Dec. 23, 2014

(65) Prior Publication Data
US 2016/0182600 A1    Jun. 23, 2016

(51) Int. Cl.
*H04L 29/08*    (2006.01)
*H04N 21/239*    (2011.01)
(Continued)

(52) U.S. Cl.
CPC ......... *H04L 67/02* (2013.01); *H04N 21/2393* (2013.01); *H04N 21/47202* (2013.01); *H04N 21/8456* (2013.01)

(58) Field of Classification Search
CPC ... H04L 67/02; H04L 65/4084; H04L 65/601; H04L 65/607; H04L 65/608; H04L 67/26;
(Continued)

(56) References Cited

U.S. PATENT DOCUMENTS

| | | | |
|---|---|---|---|
| 8,406,791 B1 * | 3/2013 | Daily ................... | H04M 3/493 379/88.06 |
| 10,348,846 B2 * | 7/2019 | Denoual ................ | H04L 47/70 |

(Continued)

FOREIGN PATENT DOCUMENTS

EP    3001693 A1 *    3/2016    ..... H04N 21/234327

OTHER PUBLICATIONS

Wei, S., & Swaminathan, V. (Sep. 2014). Cost effective video streaming using server push over HTTP 2.0. In Signal Processing (MMSP), 2014 IEEE 16th International Workshop on (pp. 1-5). IEEE. Multimedia.

(Continued)

*Primary Examiner* — Oleg Survillo
(74) *Attorney, Agent, or Firm* — Shook, Hardy & Bacon L.L.P.

(57) ABSTRACT

In various implementations, a server is configured to execute instructions stored in storage that when executed perform operations that include receiving a hypertext transfer protocol (HTTP) request to stream a video segment of multimedia content to a client device. The video segment is of a video sub-stream of the multimedia content. The operations further include sending the video segment and an audio segment to the client device based on the HTTP request for the video segment. The sending pushes the video segment and/or the audio segment to the client device. The audio segment is of an audio sub-stream of the multimedia content. A plurality of segment sets may be pushed based on the HTTP request for the video segment. Each segment set can include an additional video segment and an additional audio segment that correspond to at least partially concurrent portions of the multimedia content.

20 Claims, 7 Drawing Sheets

(51) Int. Cl.
*H04N 21/472* (2011.01)
*H04N 21/845* (2011.01)

(58) Field of Classification Search
CPC ..... H04L 65/60; H04L 2209/60; H04L 67/42; G06F 17/275; H04N 21/2393; H04N 21/47202; H04N 21/8456
USPC .......................................................... 709/217
See application file for complete search history.

(56) References Cited

U.S. PATENT DOCUMENTS

| | | | | |
|---|---|---|---|---|
| 2008/0091840 | A1* | 4/2008 | Guo | H04L 65/4084 709/231 |
| 2010/0161825 | A1* | 6/2010 | Ronca | H04N 21/23424 709/231 |
| 2011/0093605 | A1* | 4/2011 | Choudhury | H04L 65/4084 709/231 |
| 2014/0032777 | A1* | 1/2014 | Yuan | H04L 65/60 709/231 |
| 2014/0143440 | A1* | 5/2014 | Ramamurthy | H04N 21/23439 709/231 |
| 2014/0282773 | A1* | 9/2014 | Hurst | H04L 29/06 725/100 |
| 2015/0373077 | A1* | 12/2015 | Ramamurthi | H04W 76/20 709/219 |
| 2017/0006081 | A1* | 1/2017 | Grandl | H04L 67/26 |
| 2017/0085602 | A1* | 3/2017 | Wei | H04L 65/4092 |

OTHER PUBLICATIONS

Sodagar, I. (2011). The MPEG-DASH Standard for Multimedia Streaming Over the Internet. IEEE MultiMedia, 18(4), 62-67.

Mitra, S., & Swaminathan, V. (Sep. 2012). An optimal client buffer model for multiplexing HTTP streams. In Multimedia Signal Processing (MMSP), 2012 IEEE 14th International Workshop on (pp. 283-288). IEEE.

Tian, G., & Liu, Y. (Dec. 2013). On adaptive HTTP streaming to mobile devices. In Packet Video Workshop (PV), 2013 20th International (pp. 1-8). IEEE.

Hogue, M. A., Siekkinen, M., & Nurminen, J. K. (2014). Energy efficient multimedia streaming to mobile devices—a survey. IEEE Communications Surveys & Tutorials, 16(1), 579-597.

Wei, S., & Swaminathan, V. (Mar. 2014). Low latency live video streaming over HTTP 2.0. In Proceedings of Network and Operating System Support on Digital Audio and Video Workshop (p. 37). ACM.

Belshe, M. et al. (2014). Hypertext Transfer Protocol version 2, draft-ietf-httpbis-http2-13, HTTPbis Working Group (pp. 1-82). IETF.

SPDY: An experimental protocol for a faster web, available online: http://www.chromium.org/spdy/spdy-whitepaper.

Hypertext Transfer Protocol Bis (httpbis)—Charter, IETF, 2012, available online: https://datatracker.ietf.org/wg/httpbis/charter/.

Cardaci, A., Caviglione, L., Gotta, A., & Tonellotto, N. (Jun. 2013). Performance evaluation of SPDY over high latency satellite channels. In International Conference on Personal Satellite Services (pp. 123-134). Springer, Cham.

Mineki, G., Uemura, S., & Hasegawa, T. (Jan. 2013). Spdy accelerator for improving web access speed. In Advanced Communication Technology (ICACT), 2013 15th International Conference on (pp. 540-544). IEE.

Padhye, J., & Nielsen, H. F. (2012). A comparison of SPDY and HTTP performance.

Mueller, C., Lederer, S., Timmerer, C., & Hellwagner, H. (Jul. 2013). Dynamic adaptive streaming over HTTP/2.0. In Multimedia and Expo (ICME), 2013 IEEE International Conference on (pp. 1-6). IEEE.

GPAC DASH sequences, available online: http://gpac.wp.mines-telecom.fr/2012/23/dash-sequences/.

Jetty HTTP server, available online: http://www.eclipse.org/jetty/.

dash.js, DASH Industry Forum, available online: https://github.com/Dash-Industry-Forum/dash.js.

The Chromium projects, available online: http://www.chromium.org.

Swaminathan, V. (2013). Are we in the middle of a video streaming revolution?. ACM Transactions on Multimedia Computing, Communications, and Applications (TOMM), 9(1s), 40.

* cited by examiner

REDUCING REQUESTS FOR MEDIA SEGMENTS IN STREAMING OF MULTIMEDIA CONTENT

BACKGROUND

In media streaming, media content, such as video content, is presented to a user on a client device while portions of the content are being delivered, as distinguished from receiving the entire media content before playback. Media streaming solutions, such as Adobe® Primetime have adopted Hypertext Transfer Protocol (HTTP) to implement media streaming that can use existing infrastructure, such as HTTP caches and web servers. In HTTP streaming, media content is divided into at least one sequence of media segments, with each media segment typically being regarded as a separate resource for HTTP requests and responses. The media segments are individually addressable by unique uniform resource locators (URLs) and are delivered individually using the stateless request-response protocol.

While using traditional approaches to HTTP streaming, there is significant overhead as each media segment requires a corresponding request in order to be streamed. This can be compounded when a stream of media content is made of multiple sub-streams, such as an audio sub-stream and a video sub-stream. In particular, each sub-stream includes corresponding media segments, which are requested by a client device in streaming. As such, the number of sub-streams being streamed can have a multiplicative effect on the number of requests used for streaming the media content. Amongst other effects, for client devices, handling these requests can consume significant power, which rapidly drains the batteries of battery operated devices, such as mobile phones, laptops, and the like. For servers, handling these requests can require significant processing and introduce scalability issues.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Embodiments of the present invention are directed to reducing requests for media segments in the streaming of multimedia content. In particular, media segments are actively pushed to a client device without requiring a specific request from the client device for each media segment, thereby reducing the total number of requests required to stream the multimedia content. In accordance with aspects of the present disclosure, a server receives requests (also referred to as request messages) to stream media segments of multimedia content to a client device. Based on each request, the server can send to the client device a plurality of media segments of the multimedia content. In sending the media segments to the client device, at least one of the media segments is pushed to the client device, such that multiple media segments may be sent to the client device for each request message. A push (also referred to as a push message), or server push, is a network communication initiated by a server without requiring a corresponding request message specifically, or communication, in order to be sent. In this regard, a media segment(s) can be pushed by a server via a push message to a client device without the client device specifically requesting such a pushed media segment(s). As a push message does not require a corresponding request message, the total number of requests required to stream the multimedia content is reduced.

In some embodiments described herein, a stateless communication protocol (e.g. a stateless request-response communication protocol), such as HTTP is employed to stream the multimedia content. For example, the requests can be HTTP requests (i.e. requests that comply with an HTTP request protocol) and media segments may be sent to a client device via HTTP responses (i.e. responses that comply with an HTTP response protocol) and/or HTTP server pushes (i.e. pushes that comply with an HTTP server push protocol).

BRIEF DESCRIPTION OF THE DRAWINGS

The present invention is described in detail below with reference to the attached drawing figures, wherein.

DETAILED DESCRIPTION

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Media content is generally streamed to client devices by way of a sequence of media segments. Traditional approaches to streaming media content (e.g., via HTTP streaming) require a separate request, such as an HTTP request, from a client device for each media segment that is to be streamed thereto. Upon a server receiving a request from the client device, a response, such as a HTTP response, is communicated to the requesting client device along with the requested media segment. The number of requests handled by both the client device and the server can be extensive because transmission of each media segment to a client device requires a corresponding request from the client device. Further, the number of requests can be compounded when a stream of media content is made of multiple sub-streams, such as an audio sub-stream and a video sub-stream (which may be used for video on demand streaming). In particular, each sub-stream includes corresponding media segments, which are requested by a client device in streaming. As such, the number of sub-streams being streamed can have a multiplicative effect on the number of requests used for streaming the media content.

Transmission of such an extensive number of requests can impact the client device, the server, and the network transmitting the requests. For example, numerous requests transmitted from the client device can consume significant power, thereby rapidly draining the battery of the client device. For the server, handling these requests can require significant processing and introduce scalability issues. The numerous requests can also consume significant quantities of network resources, which can impair network performance for the client device and other client devices that may share the network resources with the client device.

In accordance with embodiments described herein, the number of requests required to stream media segments of multimedia content can be reduced. In this regard, as opposed to requiring a request specific to each desired media segment, the present invention is directed to actively pushing media segments to a client device without requiring a specific request from the client device for each media segment. As such, when a request, such as a HTTP request, specifies a particular media segment to stream, one or more media segments can be actively pushed to the client device even though such media segments were not specifically requested. By actively pushing media segments not specifically designated in a request, the total number of requests required to stream the media content is reduced.

In cases where a stream of multimedia content is made of multiple sub-streams (e.g., an audio sub-stream and a video sub-stream) each including corresponding media segments, media segments associated with at least one additional sub-stream not specifically requested can be pushed (e.g., separate from an HTTP response) to the client device. In this way, the number of sub-streams being streamed no longer has a multiplicative effect on the number of HTTP requests required for streaming the multimedia content. For example, assume an HTTP request received at the server specifically requests a first media segment associated with a video sub-stream. In accordance with embodiments described herein, in addition to transmitting the requested first media segment to the client device (e.g., either by way of an HTTP response or an HTTP server push), the server can also push a second media segment associated with an audio sub-stream to the client device, such that an additional HTTP request is not required for the second media segment.

Figure 1A:
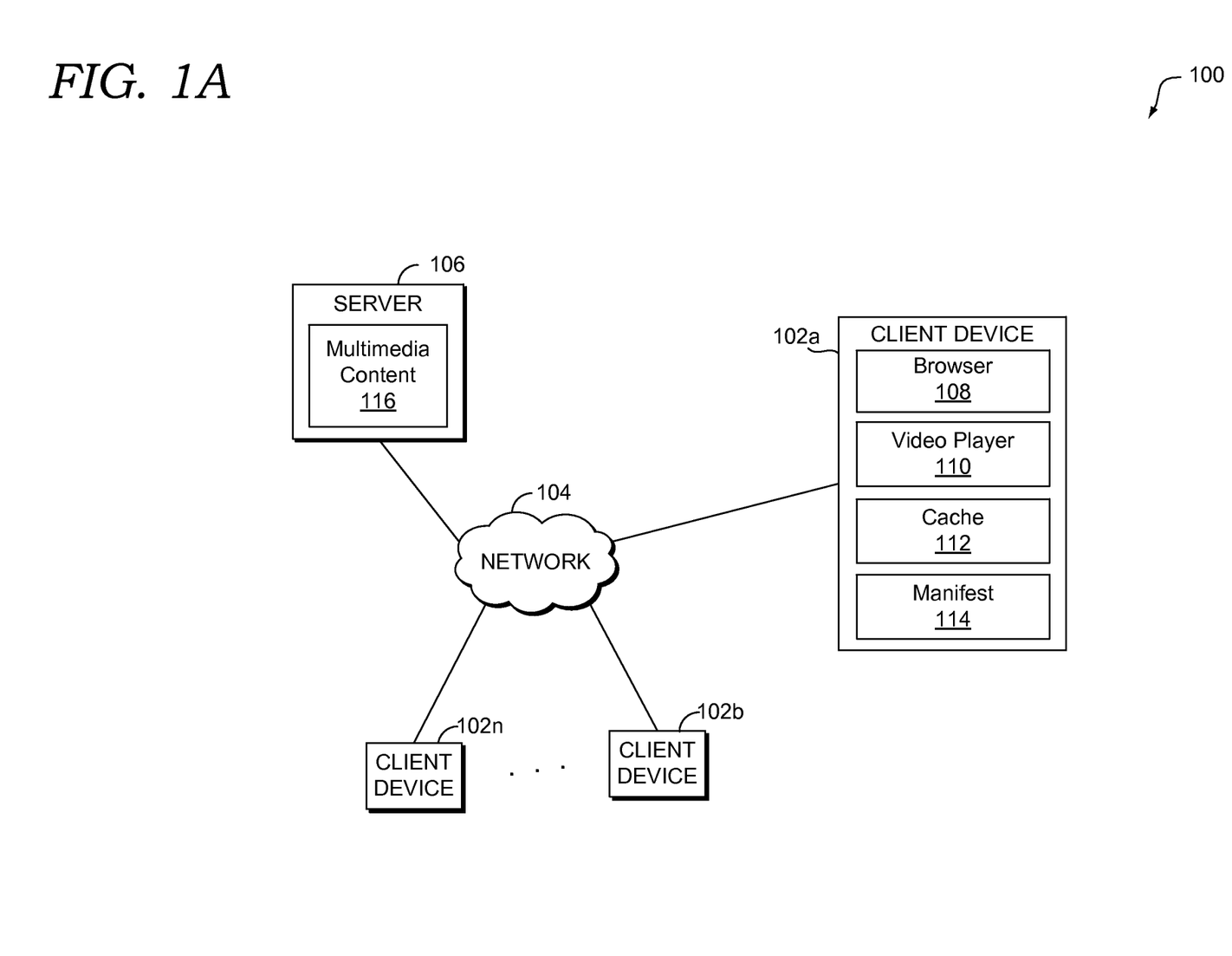
FIG. 1A is a diagram illustrating an exemplary system in accordance with implementations of the present disclosure.

Turning now to FIG. 1A, a diagram is provided illustrating an exemplary system in accordance with implementations of the present disclosure. System 100 is a client-server system that can be utilized to reduce requests for media segments in the streaming of multimedia content. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

Among other components not shown, system 100 includes any number of client devices, such as client devices 102a and 102b through 102n, network 104, and server 106. It should be understood that any number of servers and client devices may be employed within system 100 within the scope of the present disclosure. Each may comprise a single device or multiple devices cooperating in a distributed environment. Additionally, other components not shown may also be included within the distributed environment.

It should further be understood that system 100 shown in FIG. 1A is an example of one suitable computing system architecture. Each of the servers and client devices shown in FIG. 1A may be implemented via a computing device, such as computing device 600, later described with reference to FIG. 6, for example. The components may communicate with each other via network 104.

Network 104 may be wired, wireless, or both. Network 104 may include multiple networks, or a network of networks, but is shown in simple form so as not to obscure aspects of the present disclosure. By way of example, network 104 can include one or more wide area networks (WANs), one or more local area networks (LANs), one or more public networks, such as the Internet, and/or one or more private networks. Where network 104 includes a wireless telecommunications network, components such as a base station, a communications tower, or even access points (as well as other components) may provide wireless connectivity. Networking environments are commonplace in offices, enterprise-wide computer networks, intranets, and the Internet. Accordingly, network 104 is not described in significant detail.

In various implementations, client devices 102a and 102b through 102n are computing devices that are capable of accessing the Internet, such as the World Wide Web. Client devices might take on a variety of forms, such as a personal computer (PC), a laptop computer, a mobile phone, a tablet computer, a wearable computer, a personal digital assistant (PDA), an MP3 player, a global positioning system (GPS) device, a video player, a digital video recorder (DVR), a cable box, a set-top box, a handheld communications device, a smart phone, a smart watch, a workstation, any combination of these delineated devices, or any other suitable device.

Client devices 102a and 102b through 102n can include one or more processors, and one or more computer-readable media. The computer-readable media may include computer-readable instructions executable by the one or more processors. The instructions may correspond to one or more applications, such as browser 108 and video player 110, shown on client device 102a.

Browser 108, such as a web browser, can be an HTTP-compatible application (e.g. an Application that supports an HTTP protocol). A specific example of browser 108 is a Google Chrome web browser. Video player 110 may optionally be integrated into browser 108 and can be, for example, a Dynamic Adaptive Streaming over HTTP (DASH) player, or other suitable video player. Video player 110 is configured to communicate with one or more servers, such as server 106 via network 104, which may comprise the Internet.

Server 106 can be a web server capable of streaming multimedia content, such as multimedia content 116 to a client device, such as client device 102a. As a specific example, server 106 may support SPDY, which is an open networking protocol developed primarily at Google for transporting web content. The multimedia content that is streamed to the client device can be played back by video player 110 while at least a portion of the content is being delivered to the client device. Where video player 110 is integrated into browser 108, video player 110 may be a web application running on browser 108, which could employ the network stack of browser 108 for communicating with server 106. However, although browser 108 is described, video player 110 could be a standalone application, or may be integrated into any suitable application.

In some implementations, a cache, such as cache 112 can be associated with client device 102a for storing content received from server 106, such as one or more portions of multimedia content 116. As an example, cache 112 could be on client device 102a and may be a cache of browser 108 and/or video player 110. Portions of multimedia content 116 in cache 112 may correspond to media segments of multimedia content 116. Each media segment may correspond to an HTTP resource, for example, in implementations where an HTTP protocol is employed. Cache 112 may, for example, be used to temporarily store the media segments as they are received by client device 102a. Video player 110 may then access cache 112 and retrieve the media segments for playback.

Multimedia content 116 is shown as being on server 106 for illustrative purposes only. However, in various implementations, server 106 and/or other constituents of system 100 not specifically shown may include portions and/or segments of multimedia content 116. For example, system 100 may include an Internet Service Provider (ISP) cache, a Content Distributions Network (CDN) cache, and/or other caches that may assist in providing multimedia content 116 to client device 102a.

Figure 1B:
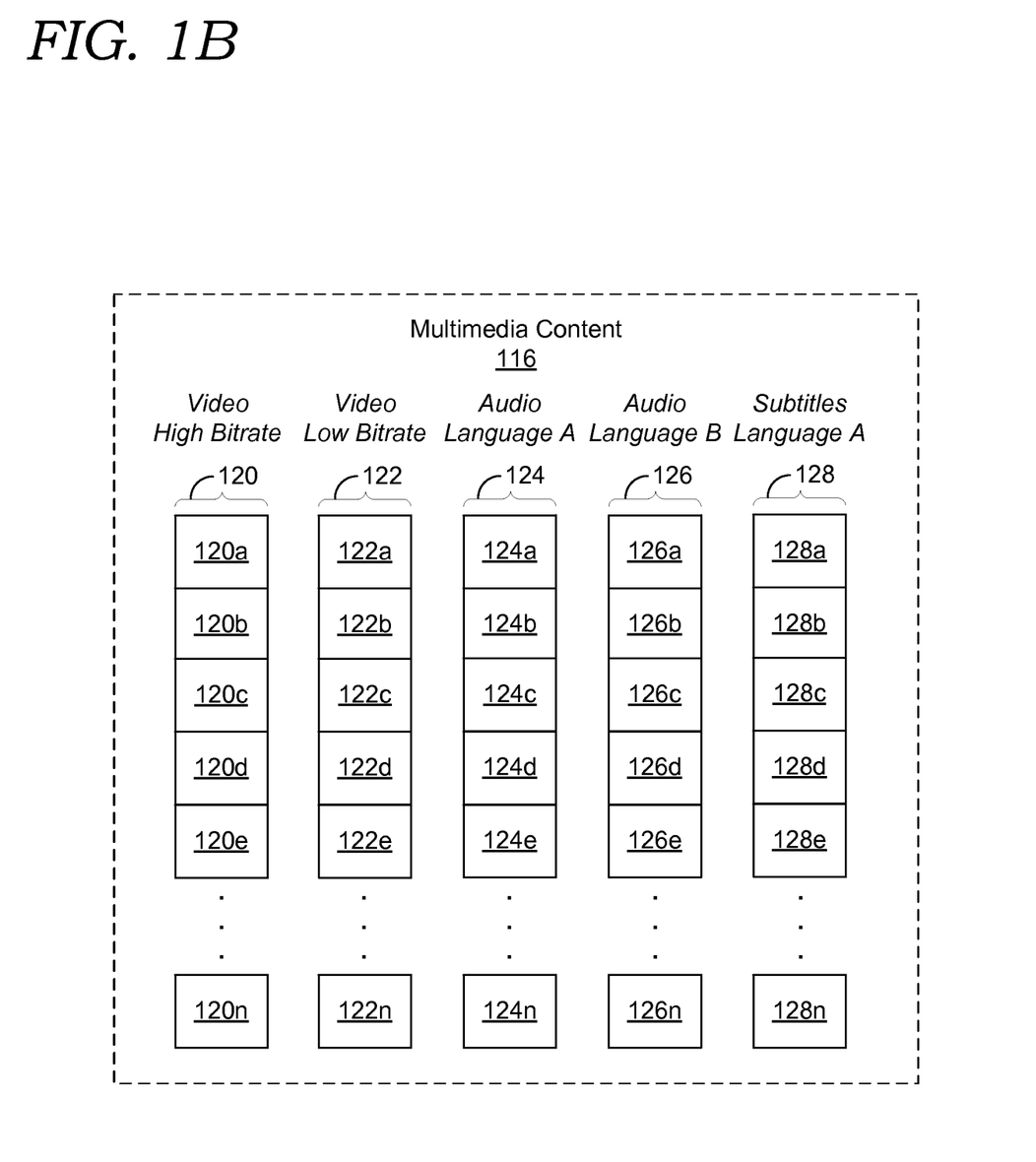
FIG. 1B shows exemplary system multimedia content in accordance with implementations of the present disclosure.

Referring now to FIG. 1B with FIG. 1A, FIG. 1B shows exemplary multimedia content 116 in accordance with implementations of the present disclosure. In accordance with implementations of the present disclosure, multimedia content can include a plurality of sub-streams. A sub-stream generally refers to a sequence of multimedia content. Each sub-stream typically spans an entirety of corresponding multimedia content. In FIG. 1B, multimedia content 116 includes sub-streams 120, 122, 124, 126, and 128, by way of example. Each sub-stream is divided into a sequence of media segments, which can be played back in order by a video player on a client device. Each media segment may correspond to a substantially fixed time period of multimedia content 116. Examples of suitable time periods may be in the range of approximately one to approximately ten seconds. For example, each media segment in FIG. 1B could correspond to a respective two second portion of multimedia content 116.

Each sub-stream in multimedia content may correspond to one or more of video, audio, text (e.g. subtitles or lyrics), still photographs, data, graphics, or any other information that can be identified, addressed, referenced or handled in any networked information system, such as the World Wide Web, or any information that can be streamed from a publisher to an end-user.

In the implementation shown, sub-stream 120 is a high bitrate video sub-stream of multimedia content 116, and comprises media segments 120a, 120b, 120c, 120d, and 120e, through 120n (which also may be referred to as "video segments"). Sub-stream 122 is a low bitrate video sub-stream of multimedia content 116 and comprises media segments 122a, 122b, 122c, 122d, and 122e, through 122n (which also may be referred to as "video segments").

Sub-stream 124 is an audio sub-stream of multimedia content 116 corresponding to Language A (e.g. English) and comprises media segments 124a, 124b, 124c, 124d, and 124e, through 124n (which also may be referred to as "audio segments"). Sub-stream 126 is an audio sub-stream of multimedia content 116 corresponding to Language B (e.g. Spanish) and comprises media segments 126a, 126b, 126c, 126d, and 126e, through 126n (which also may be referred to as "audio segments"). Sub-stream 128 is a subtitle sub-stream of multimedia content 116 and comprises media segments 128a, 128b, 128c, 128d, and 128e, through 128n (which also may be referred to as "subtitle segments").

In some cases, at least two sub-streams, such as two of sub-streams 120, 122, 124, 126, and 128 are included in streaming multimedia content 116 to a client device. For example, the stream may include at least one video sub-stream (e.g. corresponding to sub-stream 120) and at least one audio sub-stream (e.g. corresponding to sub-stream 124). As another example, the stream may include a sub-stream having both audio and video (not shown), as well as a sub stream corresponding to sub-stream 128. In some cases, the stream includes multiple audio sub-streams. For example, the audio sub-streams may correspond to respective audio channels of a surround sound system. These and other combinations of sub-streams are contemplated as being suitable for a stream.

The sub-streams that are streamed to the client device may be selected by any combination of the client device and the server. For example, the client device may select one or more sub-streams and the server may select one or more other sub-streams, or all sub-streams may be selected by one of these components. It is noted that in implementations that employ a stateless communication protocol, such as HTTP, only the client device typically selects the sub-streams. In some cases, the sub-streams that are in a steam may be default sub-streams, which may be changed before or during the stream. Sub-streams in the stream may change during the stream, for example, as selected by the client device and/or the server. For example, dynamic or adaptive bitrate streaming may be employed, where the client device may select a different bitrate and/or resolution setting or sub-stream from what is being streamed. As an example, sub-streams 120 and 122 may correspond to substantially the same video content of multimedia content 116, but at different bitrates. Client device 102a may select a lower bitrate for the stream, such that server 106 switches from sending video segments of sub-stream 120 to sending video segments of sub-stream 122 (e.g. client device 102a may request media segments of a lower bitrate sub-stream(s)). A client device may similarly select between sub-streams 124 and 126 to select the language to be played with the video content. It is also noted that there may be high and low bitrate versions of substantially the same audio content of multimedia content 116, similar to sub-streams 120 and 122.

Any to all of sub-streams 120, 122, 124, 126, and 128 may be pregenerated and packaged, or at least one may be generated and packaged on the fly. For example, at least some segments could be generated and packaged (e.g. from an unsegmented version of multimedia content) during a stream of multimedia content, or may be generated and packaged prior to the stream. In various implementations, the streaming comprises on demand streaming (e.g. video on demand streaming).

In the implementation shown, a manifest is provided to a client device, for example, from server 106, for streaming of multimedia content. For example, client device 102a is shown as having manifest 114 for streaming multimedia content 116 to client device 102a. The manifest can include information needed by a client device to request one or more media segments of corresponding multimedia content. For example, the manifest can define, or be used to define, the resources that may be requested by a client device to stream corresponding multimedia content. Each resource may correspond to a respective media segment, such as any of the media segments shown in FIG. 1B.

The manifest can further define, or be used to define, information needed by a client device to include in requests for the resources. As an example, the client device may use a request comprising a URL provided by the manifest to request a corresponding resource. In some cases, the URL may be generated from the information in the manifest. However, one to all URLs could be pregenerated in the manifest, and extracted by the client device for requests.

The manifest can also identify the sub-streams available for streaming in multimedia content. For multimedia content 116, those sub-streams may be any to all of the various sub-streams shown in FIG. 1B. As such, the client device may identify what bitrates and/or resolutions are available to stream multimedia content from a corresponding manifest. Thus, the client device may select to change the bitrate and/or resolution of one or more sub-streams in the stream based on the manifest. As an example, the client device may request resources, or media segments, of a lower bitrate video sub-stream after having requested resources of a higher bitrate video sub-stream.

While using traditional approaches to HTTP streaming, there is significant overhead as each media segment requires a corresponding request to be streamed. This can be compounded when a stream of media content is made of sub-streams, such as an audio sub-stream and a video sub-stream. In particular, each sub-stream includes corresponding media segments, which are requested by a client device in streaming. As such, the number of sub-streams being streamed can have a multiplicative effect on the number of requests used for streaming the media content. Amongst other effects, for client devices, handling these requests can consume significant power, which rapidly drains the batteries of battery operated devices, such as mobile phones, laptops, and the like. For servers, handling these requests can require significant processing and introduce scalability issues.

To illustrate the forgoing, to stream multimedia content 116 to client device 102a, client device 102a may request media segment 120a and receive a response that includes media segment 120a. A response (also referred to as a response message) is a network communication requiring a corresponding request message, or communication, in order to be sent. Where the stream only includes sub-stream 120, this request and response pattern may continue for each media segment in sub-stream 120, concluding with a request and response for media segment 120n. As a result, a complete stream of sub-stream 120 may include at least n request-response pairs, where n is the number of media segments streamed.

Further illustrating the foregoing, assume, client device 102a is to play back both sub-streams 120 and 124 substantially concurrently, for example, where sub-stream 124 is an audio sub-stream that accompanies sub-stream 120, which is a video sub-stream. Client device 102a may request media segment 120a and receive a response that includes media segment 120a. Client device 102a may subsequently request media segment 124a and receive a response that includes media segment 124a. As each video segment of sub-stream 120 has a corresponding audio segment of sub-stream 124 for playback, client device 102a refrains from playing back media segment 120a until the audio content of media segment 124a is also received and ready for playback. Furthermore, a complete stream of sub-stream 120 may include at least 2n request-response pairs, where n is the number of segments streamed.

In accordance with aspects of the present disclosure a server can receive requests to stream media segments of multimedia content to a client device. Based on each request, the server can send to the client device a plurality of media segments of the multimedia content, which includes at least one requested media segment of the multimedia content. In sending the media segments to the client device, at least one of the media segments is pushed to the client device, such that multiple media segments may be sent to the client device for each request. Thus, the total number of requests required to stream the multimedia content is reduced.

It is noted that in some implementations, a request is for only a single media segment and one or more other media segments are unrequested and automatically sent by the server based on the request (e.g. using a predetermined push strategy or as determined by the server). In this case, the request for other media segments can be implicit. An advantage of implicitly requesting media segments is that requests sent by a client device may be similar to requests utilized in traditional HTTP streaming. For example, HTTP requests may use standard URLs employed in traditional HTTP streaming.

However, in various implementations, a request may be for multiple media segments, such as each media segment that is to be sent by the server in response to the request. In particular, the request for multiple media segments may be explicit, with some indication that multiple media segments are being requested. In these cases, the requests may be implemented utilizing special, or modified URLs, from what is employed in traditional HTTP streaming. The special URLs could be generated from standard URLs or other information about the multimedia content, for example included in a manifest, or could be pregenerated in a manifest provided by a server (e.g. manifest 114). In addition, or instead, requests in these cases may be implemented utilizing a header extension, where the header specifies the request is for multiple media segments and/or how many media segments should be sent.

In some respects, a request could indicate a number of media segments to send in response to or based on the request. In some cases, a request can specify a reference media segment and a request number used by a server to determine which media segments to send in response to or based on the request. For example, the reference media segment could be a starting media segment in a sequence of media segments to send to a client device, and the request number could indicate how many total media segments are to be sent by the server. As another example, a request could specify or indicate a starting media segment and an ending media segment in a group of sequential media segments to be sent to the client device based on the request.

Thus, is should be appreciated that one to all of the additional media segments that are sent in response to a request may have been explicitly and/or implicitly requested by the request. Furthermore, one to all of the additional media segments that are sent in response to a request may be sent based on having been explicitly and/or implicitly identified by the request. Any combination of a header and URL, or Uniform Resource Identifier (URI), may be used to specify the various parameters utilized to request media segments.

In various implementations, media segments can be pushed to a client device utilizing a stateless communication protocol (e.g. a stateless request-response communication protocol), such as HTTP, and more specifically HTTP 2.0 or greater. In particular, one to all of the media segments that are sent to a client device based on a request may be included in corresponding HTTP server push messages (e.g. HTTP 2.0 or greater server push messages), or multiple media segments may be included in a single push message. As a corresponding request is not required for each media segment sent to the client device, the total number of requests required to stream multimedia content can be reduced.

In some cases, a media segment that is sent in response to a request message (e.g. an HTTP request) may be included in a response message (e.g. an HTTP response) to the request message, and remaining media segments that are sent are in respective push messages (e.g. in HTTP server pushes) to the client device. In other cases, each media segment may be included in a respective push message. In some implementations, a response message is still employed, but is utilized as an acknowledgement to a request message. Subsequently, the media segments are pushed to the client device based on the request message.

In sending a media segment in a push message, the push message can comprise information needed to ensure cache-coherence throughout the cache or caches that are utilized to stream the multimedia content. For example, an HTTP server push of a media segment may comprise the same information utilized in a typical HTTP response of that media segment. This information can include an identifier of the media segment, such as the URL from the manifest. Thus, the caches may serve the pushed media segment as if it was cached without using a push message.

In some respects, the present disclosure relates to a server sending multiple media segments to a client device based on a request for a media segment from the client device to stream multimedia content, where the stream is of a single sub-stream of multimedia content. Thus, each media segment may be of the same sub-stream of multimedia content.

However, in various implementations, the present disclosure relates to a server sending multiple media segments to a client device based on a request for a media segment from the client device to stream multimedia content, where the stream is of multiple sub-streams of multimedia content. In these implementations, the media segments that are sent may be of any of the various sub-streams of the multimedia content being streamed. For example, at least one media segment may be of one to all of the sub-streams for a stream.

At least some of the media segments that are sent can correspond at least partially to concurrent portions of the multimedia content. In particular, these media segments may at least partially temporally overlap in the multimedia content, may completely overlap in the multimedia content, or may correspond to a substantially same time period in the multimedia content. Examples of concurrent portions of multimedia content are media segments in FIG. 1B that share the same letter in their reference signs. A more specific example comprises media segments 120*c*, 122*c*, 124*c*, 126*c*, and 128*c*. However, it will be appreciated that not all of those segments are necessarily streamed, as not all sub-streams are necessarily included in the stream. For example, a stream may only include one of sub-streams 120 and 122, one of sub-streams 124 and 126, and optionally sub-stream 128 and/or other sub-streams.

Where received media segments correspond to at least partially concurrent portions of the multimedia content, a client device may play back the received media segments at least partially concurrently (i.e. the content of those segments may be played back at least partially concurrently). For example, audio and video segments that correspond to substantially the same time period in the multimedia content may be played back together.

In sending multiple media segments based on a request from a client device, it may be desirable that at least one media segment follows, or immediately follows, another media segment in the multimedia content. For example, at least some of the media segments that are sent may be part of a sequence of consecutive media segments in the same sub-stream. This may be beneficial in that media segments are typically played back in the sequence, such that the media segments may successively be needed by the client device playback. Thus, in some cases, it may be desirable to send the media segments to the client device in an order based on, or corresponding to, a sequence of the media segments in the multimedia content (e.g. in the order of the sequence).

In some respects, a plurality of segment sets is sent based on a request for at least one media segment. Each segment set in the plurality of segment sets can comprise a media segment of a first sub-stream of multimedia content, and a media segment of a second sub-stream that correspond to at least partially concurrent portions of the multimedia content. Furthermore, the segments sets may be part of a sequence of such segment sets in the multimedia content. In some cases, each segment set includes a media segment of each sub-stream in the stream.

Figure 2:
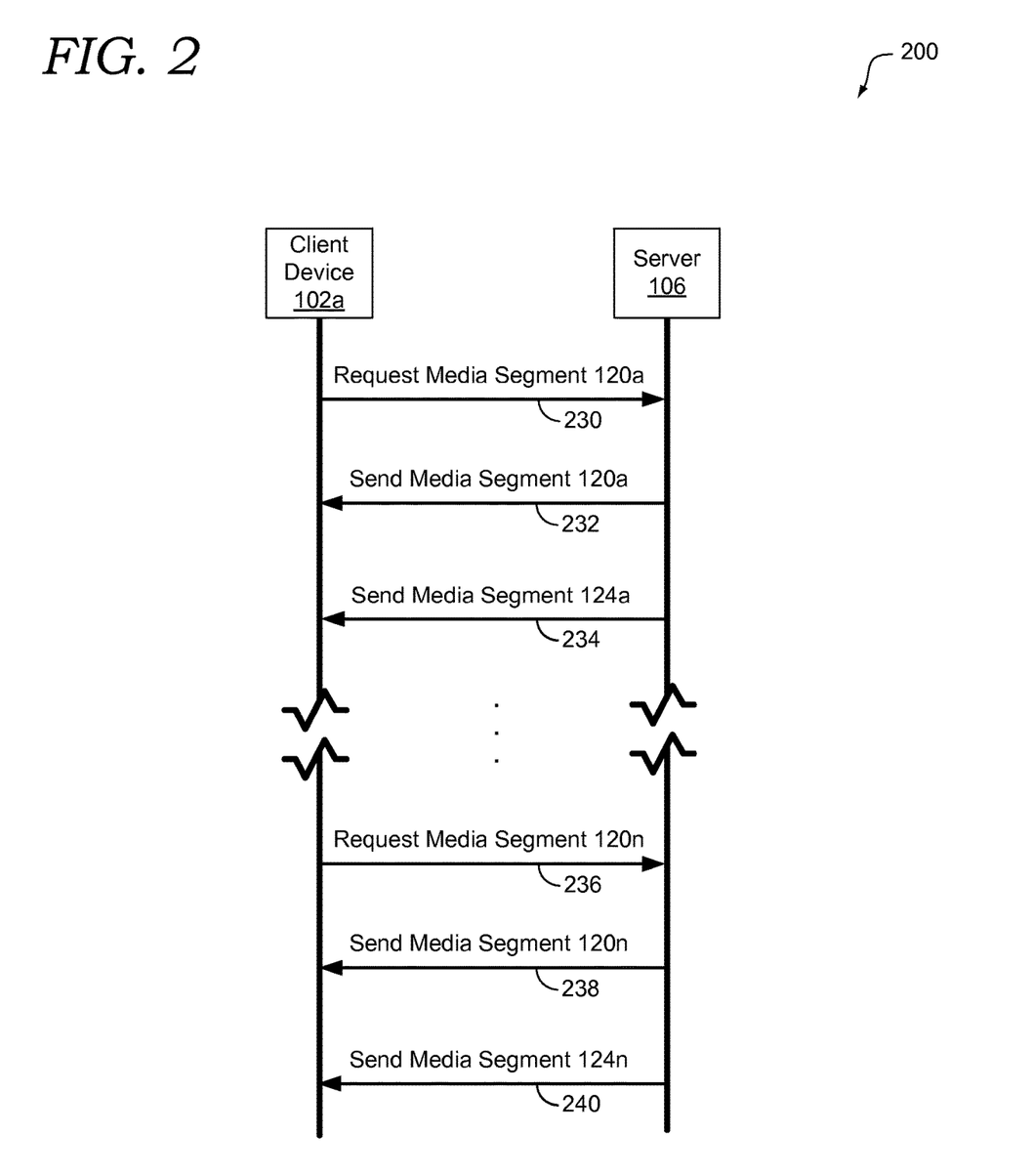
FIG. 2 illustrates a flow diagram of an exemplary stream of multimedia content in accordance with implementations of the present disclosure.

Any combination of the forgoing concepts can be incorporated into a push strategy for streaming multimedia content. An exemplary push strategy is described with respect to FIG. 2 with FIGS. 1A and 1B. FIG. 2 illustrates a flow diagram of an exemplary stream of multimedia content in accordance with implementations of the present disclosure. In particular, the flow diagram of FIG. 2 is for stream 200 of multimedia content 116 from server 106 to client device 102*a*.

In some implementations, stream 200 is provided utilizing a push strategy where, based on a request for at least one media segment, server 106 sends at least two media segments that correspond to at least partially concurrent portions of multimedia content 116. For example, in stream 200, each request is for a video segment, and in response, the video segment and an audio segment temporally corresponding to the video segment are both sent to client device 102*a*. One to all of the segments is pushed from server 106 to client device 102*a*, such that they are available to client device 102*a* in cache 112 and need not be subsequently requested. Thus, the number of requests (i.e. request messages) required by stream 200 is reduced by half as compared to traditional HTTP streaming.

As shown, stream 200 begins with client device 102*a* requesting media segment 120*a* (message 230). In response, server 106 sends media segment 120*a* (message 232) followed by media segment 124*a* (message 234). Utilizing HTTP responses and requests, message 232 will typically be a response message and message 234 will typically be a server push, as shown. However, in other cases, one or both of those messages may be server pushes, for example, where a response is utilized to acknowledge message 230 without including a media segment in the response, followed by the messages having the media segments. In further cases, both of those messages may be a response to message 230, for example, in implementations where message 230 is capable of requesting multiple media segments. These and other variations are possible.

Furthermore, the order that messages 232 and 234 are sent could optionally be altered from what is shown. In particular, message 234 may be sent before message 232. The order of other messages sent in response to a request may similarly be altered for one to all other requests in stream 200, or other streams, or variations thereof, described herein. Having received both media segments 120a and 124a, the content corresponding to those media segments may be available to client device 102a for playback (e.g. concurrent playback).

As indicated in FIG. 2, this pattern may repeat through media segments 120n and 124n, where unsent media segments are requested and sent in each repetition. For example, after message 234, client device 102a may request media segment 120b, then media segment 120c, and so on until concluding with client device 102a requesting media segment 120n (message 236). In response to requesting media segment 120n, server 106 may send media segment 120n (message 238) followed by or concurrent with media segment 124n (message 240).

Although the implementation of FIG. 2 is shown with respect to sub-streams 120 and 124 of multimedia content 116, the exemplary push strategy could be employed for any of various sub-streams in the multimedia content. For example, sub-stream 120 could be substituted for sub-stream 122 and sub-stream 124 could be substituted for sub-stream 126. Furthermore, the requests could instead be for media segments in sub-stream 124 where the media segments of sub-stream 120, or of another sub-stream, are sent in response to the requests.

Additionally, although in FIG. 2, media segments of one additional sub-stream are sent in response to requests for media segments in another sub-stream, media segments of any number of additional sub-streams could be sent. Any to all of these additional media segments could be temporally concurrent to the other media segments that are sent in response to a request. Thus, the number of requests required to stream multimedia content may not be multiplicative with the number of sub-streams included in the stream. An example of a suitable additional sub-stream would be sub-stream 128, which is a subtitle sub-stream. Thus, for example, media segment 128a could be sent immediately following media segment 120a or 124a in FIG. 2, and more generally, media segment 128n could be sent immediately following media segment 120n or 124n in FIG. 2. It is however noted that sub-stream 128 may not be needed for subtitles, as the subtitle content could be incorporated into another sub-stream, such as sub-stream 120 or 124.

Figure 3:
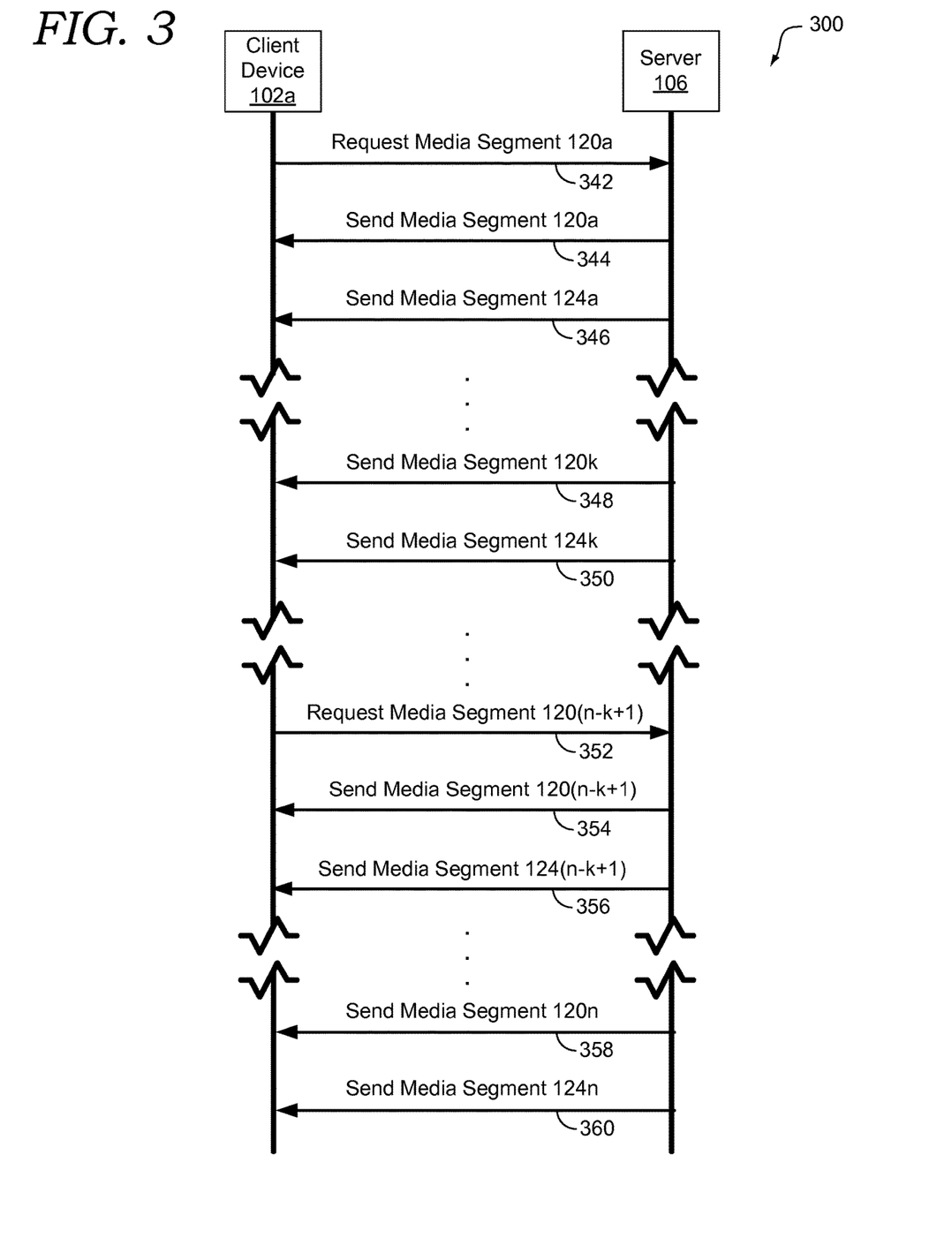
FIG. 3 illustrates a flow diagram of an exemplary stream of multimedia content in accordance with implementations of the present disclosure.

The push strategy described with respect to FIG. 2 can be used to reduce the number of requests required to stream multimedia content to a client device by a factor of the number of sub-streams included in the stream. Thus, stream 200 may have half the number of requests as compared to other approaches to streaming sub-streams 120 and 124. Another exemplary push strategy described with respect to FIG. 3 with FIGS. 1A and 1B can be used to further reduce the number of requests required for streaming multimedia content to a client device. FIG. 3 illustrates a flow diagram of an exemplary stream of multimedia content in accordance with implementations of the present disclosure. In particular, the flow diagram of FIG. 3 is for stream 300 of multimedia content 116 from server 106 to client device 102a.

The push strategy exemplified by FIG. 3 may be referred to as k-push strategy. In some respects, the k-push strategy can be seen as an extension to the push strategy described with respect to FIG. 2, as will be appreciated from the following description. In a k-push strategy, the k value defines how many segment sets are pushed in response to a request. Using the k-push strategy, in addition to sending a requested sub-stream and at least one temporally concurrent sub-stream as in FIG. 2, server 106 may also push k−1 consecutive segment sets to client device 102a. Each segment set may comprise temporally concurrent media segments of sub-streams of multimedia content 116 that are being streamed to client device 102a (e.g. of the same sub-streams in the segment set sent prior to the k−1 pushes). Thus, in some respects, stream 200 of FIG. 2 may be thought of in terms of a k-push strategy where k=1. The order that the segment sets are sent to client device 102a can be based on the sequence of the segment sets in multimedia content 116. In particular, the segment sets may be sent in an order corresponding to the sequence of the segment sets in the multimedia content, as shown in FIG. 3.

Thus, in stream 300, each request is for a video segment, and in response, the video segment and an audio segment temporally corresponding to the video segment are both sent to client device 102a. Additionally, k−1 segment sets immediately following the audio and video segments are pushed to client device 102a. The k−1 segment sets comprise consecutive segment sets of video and audio segments of multimedia content 116. Thus, the number of requests (i.e. request messages) required by stream 300 is reduced by k as compared to traditional HTTP streaming, even where a single sub-stream is being streamed.

As shown, stream 300 begins with client device 102a requesting media segment 120a (message 342). In response, server 106 sends media segment 120a (message 344) followed by or concurrent with media segment 124a (message 346). Utilizing HTTP responses and requests, message 344 will typically be a response message and the remaining messages sent based on that request will typically be server pushes, as shown. However, in other cases, each of those messages may be server pushes, for example, where a response is utilized to acknowledge message 342 without including a media segment in the response, followed by the messages having the media segments. In further cases, two or more of those messages may be a response to message 342, for example, in implementations where message 342 is capable of requesting multiple media segments. These and other variations are possible.

Media segments 120a and 124a may collectively be considered a segment set sent to client device 102a based on a request. Additionally, based on the request, server 106, consecutively pushes k−1 segment sets comprising media segment 120k and media segment 124k, when k>1.

As indicated in FIG. 3, this pattern may repeat such that each media segment in the stream is sent using this approach. Thus, stream 300 may conclude with client device 102a requesting media segment 120(n−k+1) (message 352). In response, server 106 may send media segment 120(n−k+1) (message 354) followed by media segment 124(n−k+1) (message 356). Also in response, server 106 may consecutively push k−1 segment sets, as described above. It is noted that in the final repetition of this pattern, there may not be k−1 segment sets remaining in multimedia content 116 to push. Nonetheless, stream 300 may conclude with sending media segment 120n (message 358) to client device 102a, followed by media segment 124n (message 360).

In the foregoing example, each segment set may comprise each media segment needed by client device 102a to play back a given time period of multimedia content 116. Thus, as with the push strategy described with respect to FIG. 2, the sub-streams and corresponding media segments being sent to client device 102a can vary from the example of FIG.

3, with media segments from more, fewer, or different sub-streams of multimedia content 116 being included in each segment set.

It is further noted that the sub-streams streamed and the number of sub-streams streamed can vary throughout a stream in any of the exemplary push strategies described herein. For example, as noted above, the sub-streams included in a stream of multimedia content can vary throughout the stream. In some cases, the client device could select at least one new sub-stream, or the server could select at least one new sub-stream for the stream (which could optionally replace another sub-stream in the stream). These scenarios may allow for adaptive streaming to the client device. As an example, a client device (e.g. a user of the client device) could selectively turn off a subtitle sub-stream, switch to a subtitle sub-stream corresponding to a different language, or switch to an audio sub-stream corresponding to a different language during a stream. Other scenarios contemplated by the present disclosure occur when the stream supports adaptive bitrate switching, in which the bitrate of the stream is adjusted based on the client device's bandwidth and/or processing capacity. As an example, in adaptive bitrate streaming, client device 102a could select between sub-streams 120 and 122, which are high and low bitrate versions of the same video content.

Advantages of the foregoing push strategies include saving power, which can prolong the battery life of battery operated devices, such as mobile phones, laptops, and the like. As an example, assume client device 102a can download a two second media segment in one second. In this case, client device 102a could download three segments in three seconds. While using traditional HTTP streaming, client device 102a may send a request out every two seconds, as media segments are played back, so as to retain a buffer of media segments in cache 112. In contrast, in accordance with implementations of the present disclosure, one request could be sent out for all three media segments. Thus, client device 102a transmit fewer requests, thereby saving power and battery life.

From the foregoing, it should be appreciated that using a k-push strategy, where the k value defines how many segment sets are pushed in response to a request, the total requests needed to stream multimedia content may decrease with the k value. As such, the improvements to battery life of a battery operated device may improve accordingly. However, high k values may not always be advantageous, such as where adaptive streaming is available to stream to a client device and the sub-stream(s) streamed are frequently changed.

In some cases, the k-push strategy may employ a constant k value. However, in other cases, the k value can vary in the same stream. A k value in a k-push strategy may be determined by a server and/or a client device. A determination of a k value may be based on any of a variety of possible factors. One such factor is the power level or battery power level of the client device. The k value may be increased or otherwise determined based on the battery power level falling below a threshold amount.

Another such factor is the bitrate for a stream to the client device. The k value may be reduced based on switching to a higher bitrate for the stream, or in some cases, simply based on including one or more new sub-streams in the stream. Yet another factor could be based on an amount of times or predicted amount of times the client device switches the sub-streams being streamed in adaptive bitrate streaming. Where the amount or predicted amount exceeds a threshold value, the k value may be reduced. In adaptive bitrate streaming, a predicted amount of times a client device will switch sub-streams in a stream is higher where the bandwidth available to the client device is unstable. Thus, one factor considered in determining a k value could be based on the stability of bandwidth available to the client device. The stability could be sub-streamed over time, and could be quantified as a bandwidth stability value.

In some respects, the server may derive a k value from a communication from the client device. For example, a client device may specify a k value to a server in a request for a media segment, or in a separate communication from a request for a media segment. Where a communication to the server includes the k value, the server may set the k value for the k-push strategy to the communicated k value based on the communication. The communication could include one or more other types of information utilized by the server to determine a k value. For example, any of the factors described above for determining k values could be incorporated into information provided to the server. Examples include power level or battery power level indicators, and bandwidth or bandwidth stability values, with respect to the client device.

Figure 4:
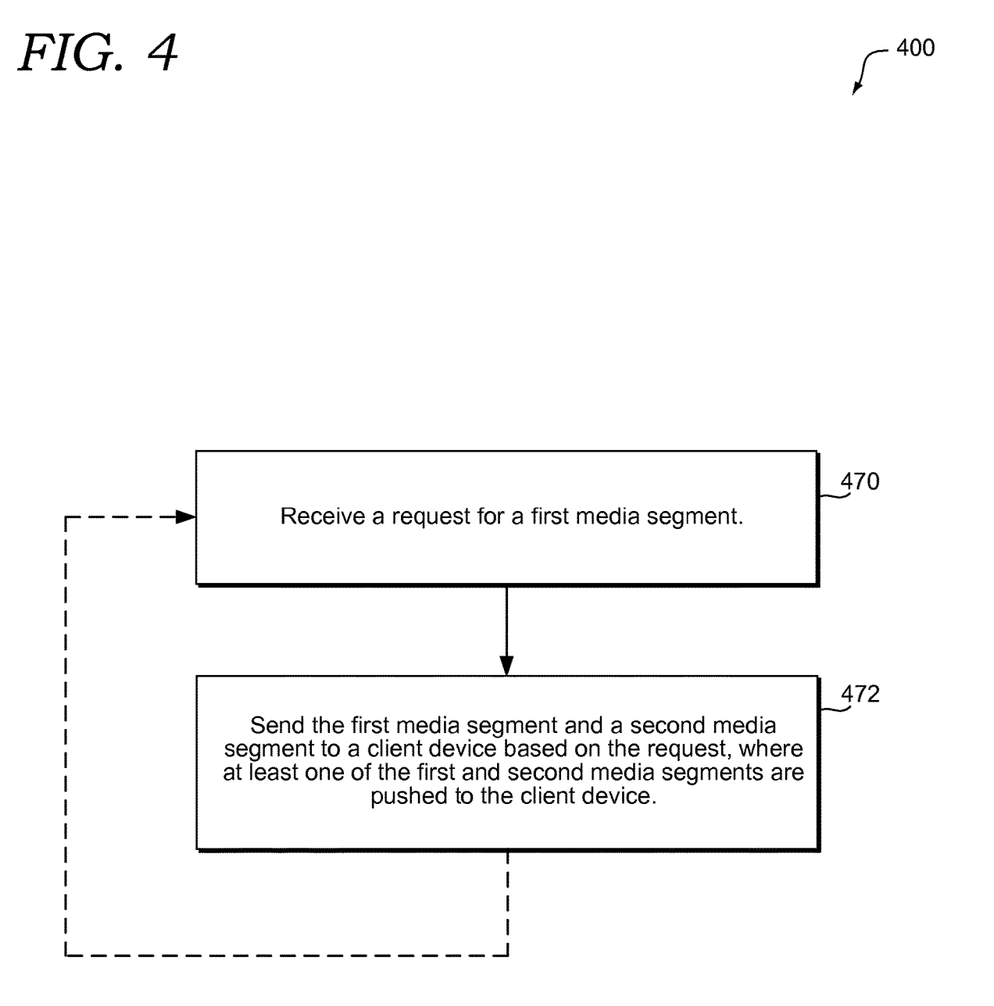
FIG. 4 is a flow diagram showing method for providing media segments to client devices in accordance with implementations of the present disclosure.

Having described various aspects of the present disclosure, exemplary methods are described below for providing media segments to client devices. Referring to FIG. 4 with FIGS. 1A, 1B, and 3, FIG. 4 is a flow diagram showing method 400 for pushing media segments to client devices in accordance with implementations of the present disclosure. Each block of method 400 and other methods described herein comprises a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a standalone application, a service or hosted service (standalone or in combination with another hosted service), or a plug-in to another product, to name a few.

At block 470, a request is received for a first media segment. For example, server 106 can receive message 342 from client device 102a, comprising a request from client device 102a for media segment 120a in stream 300 of multimedia content 116. Media segment 120a is of sub-stream 120 of multimedia content 116. The request could be for more than the first media segment, but for the present example, let us assume that the request is only explicitly for media segment 120a. The request may be an HTTP request comprising a URL from manifest 114 that corresponds to media segment 120a.

Continuing with block 472, the first media segment and a second media segment are sent to a client device based on the request, where at least one of the first and second media segments are pushed to the client device. For example, in stream 300, server 106 sends media segments 120a and 124a to client device 102a based on, or in response to, message 342. The sending pushes at least one of media segments 120a and 124a to client device 102a. Thus, a single request from client device 102a causes server 106 to send multiple media segments.

As described previously, more than two media segments may be sent based on a request. For example, in stream 300, using a k-push strategy, when k>1, one or more additional segment sets may be pushed to client device 102a. Each segment set in stream 300 includes a media segment of sub-stream 120 and a media segment of sub-stream 124 and the segment sets may be consecutively sent to client device 102a. Although each segment set comprises two elements, or members, more or fewer members could be included in each set in other implementations. For each segment set, corresponding members from one set to another set can be of the same sub-stream of multimedia content 116, but at different time periods in the sub-stream. In particular, the time period may sequentially and consecutively increase with each segment set in the order they appear in multimedia content 116. In stream 300, sub-streams 120 and 124 are being streamed to client device 102a. However, as indicated above, stream 300 could include more or fewer sub-streams.

As indicated in FIG. 4, this pattern can optionally repeat. For example, assuming k=2, in the second instance client device 102a requests media segment 120c and server 106 sends media segments 120c, 124c, 120d, and 124d to client device 102a. In a third instance, client device 102a requests media segment 120e and server 106 sends media segments 120e, 124e, 120f, and 124f to client device 102a. This pattern can continue until multimedia content 116 is fully streamed, or until stream 300 is otherwise terminated. It will be appreciated that this pattern may be interrupted or altered for a variety of reasons, such changing k values, or video player 110 skipping forward or backward in multimedia content 116.

Figure 5:
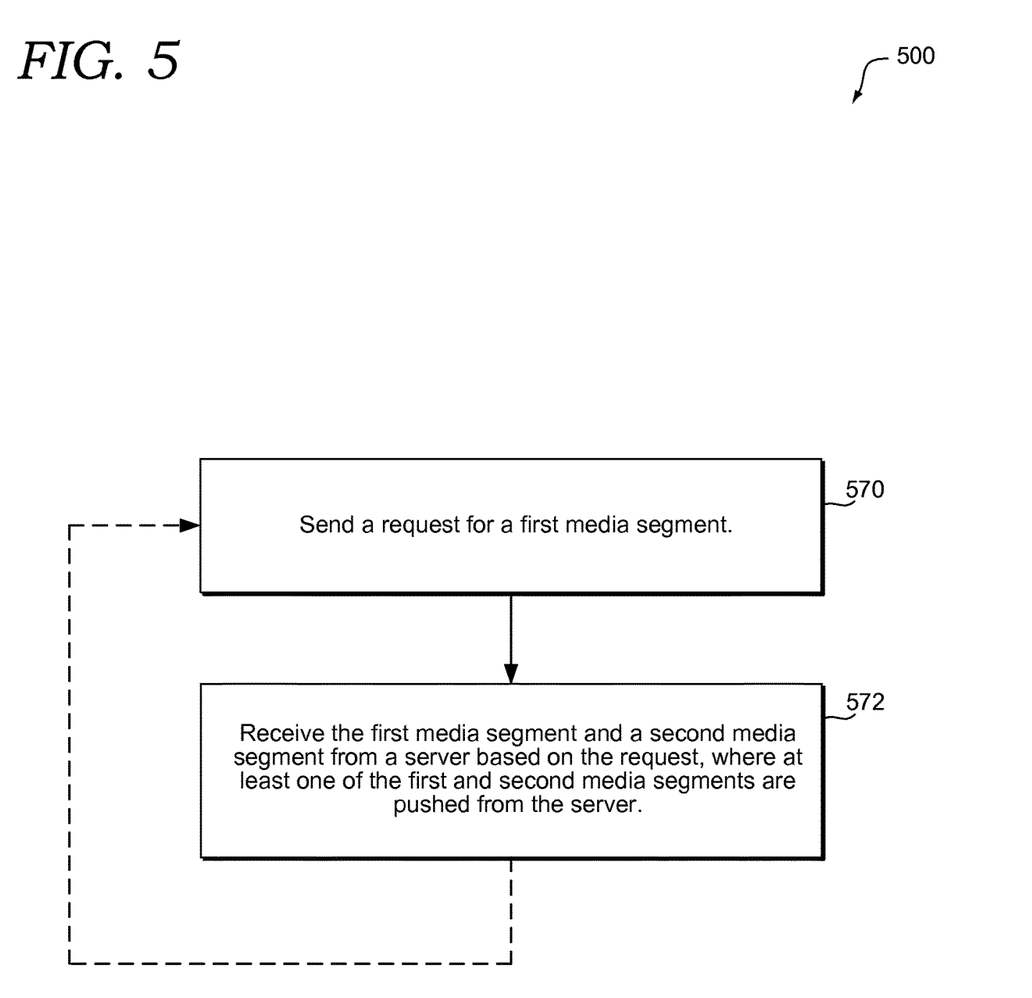
FIG. 5 is a flow diagram showing method for providing media segments to client devices in accordance with implementations of the present disclosure.

Referring now to FIG. 5 with FIGS. 1A, 1B, and 3, FIG. 5 is a flow diagram showing method 500 for providing media segments to client devices in accordance with implementations of the present disclosure. At block 570, a request is sent for a first media segment. For example, in stream 300, client device 102a sends message 342 comprising a request for media segment 120a, to server 106. Media segment 120a is of sub-stream 120 of multimedia content 116.

At block 572, the first media segment and a second media segment are received from a server based on the request, where at least one of the first media segment and the second media segment are pushed from the server. For example, media segments 120a and 124a are received by client device 102a from server 106 based on, or in response to, message 342. Media segment 124a is of sub-stream 124 of multimedia content 116. As least one of media segments 120a and 124a are pushed from server 106 in messages 344 and 346.

Having received both media segments 120a and 124a, video player 110 may play back multimedia content 116 using media segments 120a and 124a. For example, media segments 120a and 124a may be at least partially concurrent, or temporally overlapping, portions of multimedia content 116. Thus, the content of media segments 120a and 124a may be played back at least partially concurrently so as to portray multimedia content 116 as intended. Media segments received by client device 102a may be stored in cache 112 of client device 102a. Cache 112 can comprise a buffer, and client device 102a may issue at least some subsequent requests is stream 300 based on an amount of media segments in the buffer. Stream 300 can continue until multimedia content 116 is fully streamed (e.g. until client device 102a has received all media segments ending with media segments 120n and 124n), or until the stream 300 is otherwise terminated.

Figure 6:
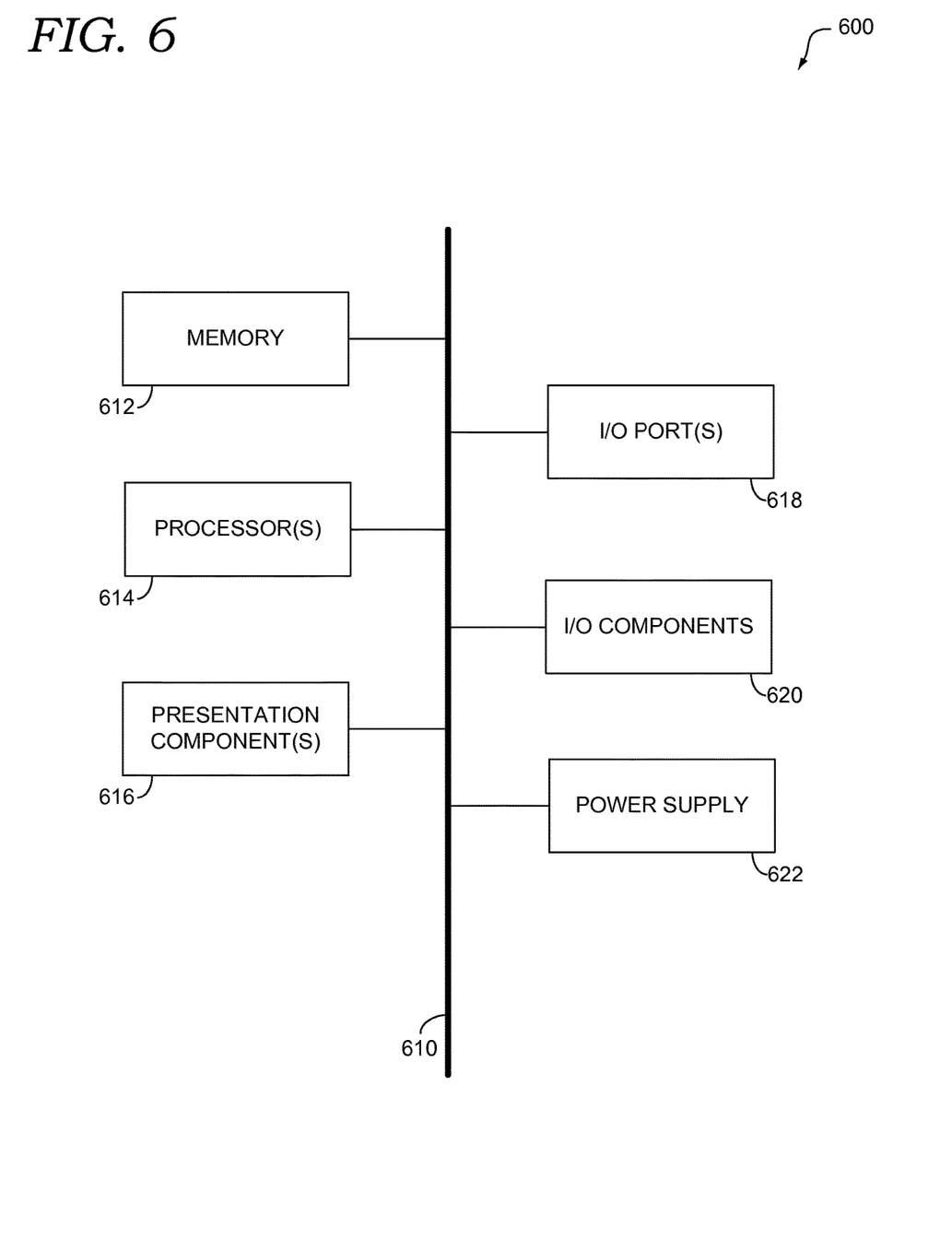
FIG. 6 is a block diagram of an exemplary computing environment suitable for use in implementations of the present disclosure.

Having described implementations of the present disclosure, an exemplary operating environment in which embodiments of the present invention may be implemented is described below in order to provide a general context for various aspects of the present disclosure. Referring initially to FIG. 6 in particular, an exemplary operating environment for implementing embodiments of the present invention is shown and designated generally as computing device 600. Computing device 600 is but one example of a suitable computing environment and is not intended to suggest any limitation as to the scope of use or functionality of the invention. Neither should the computing device 600 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 6, computing device 600 includes bus 610 that directly or indirectly couples the following devices: memory 612, one or more processors 614, one or more presentation components 616, input/output (I/O) ports 618, input/output components 620, and illustrative power supply 622. Bus 610 represents what may be one or more busses (such as an address bus, data bus, or combination thereof). Although the various blocks of FIG. 6 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors recognize that such is the nature of the art, and reiterate that the diagram of FIG. 6 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 6 and reference to "computing device."

Computing device 600 typically includes a variety of computer-readable media. Computer-readable media can be any available media that can be accessed by computing device 600 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 600. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 612 includes computer-storage media in the form of volatile and/or nonvolatile memory. The memory may be removable, non-removable, or a combination thereof. Exemplary hardware devices include solid-state memory, hard drives, optical-disc drives, etc. Computing device 600 includes one or more processors that read data from various entities such as memory 612 or I/O components 620. Presentation component(s) 616 present data indications to a user or other device. Exemplary presentation components include a display device, speaker, printing component, vibrating component, etc.

I/O ports 618 allow computing device 600 to be logically coupled to other devices including I/O components 620, some of which may be built in. Illustrative components include a microphone, joystick, game pad, satellite dish, scanner, printer, wireless device, etc. The I/O components 620 may provide a natural user interface (NUI) that processes air gestures, voice, or other physiological inputs generated by a user. In some instance, inputs may be transmitted to an appropriate network element for further processing. A NUI may implement any combination of speech recognition, touch and stylus recognition, facial recognition, biometric recognition, gesture recognition both on screen and adjacent to the screen, air gestures, head and eye tracking, and touch recognition associated with displays on the computing device 600. The computing device 600 may be equipped with depth cameras, such as, stereoscopic camera systems, infrared camera systems, RGB camera systems, and combinations of these for gesture detection and recognition. Additionally, the computing device 600 may be equipped with accelerometers or gyroscopes that enable detection of motion. The output of the accelerometers or gyroscopes may be provided to the display of the computing device 600 to render immersive augmented reality or virtual reality.

As described above, implementations of the present disclosure provide for reducing the number of requests required for streaming multimedia content to client devices. The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. A computer-implemented method for streaming media, the computer-implemented method comprising:
  receiving, by a server in a media stream from a client device, a request to stream an explicitly identified first media segment to the client device, the first media segment being of a first sub-stream dividing a first portion of multimedia content into a first set of sequential segments, wherein the request implicitly identifies a second media segment of a second sub-stream dividing a second portion of the multimedia content into a second set of sequential segments, wherein the first sub-stream is at least partially concurrent with, and of a different type of media than, the second sub-stream, wherein the request specifies a designated number of consecutive media segments to send without specifically designating identifiers for a subset of the consecutive media segments; and
  sending, by the server in the media stream, the requested first media segment and the second media segment to the client device in response to the request for the first media segment, bypassing a separate request for the second media segment.

2. The method of claim 1, wherein the request from the client device implicitly identifies the second media segment based on a push strategy of the server that identifies the second media segment as being at least partially concurrent with the first media segment.

3. The method of claim 1, wherein the request from the client device specifies the designated number of consecutive media segments to send using at least one of a header extension, a URL, or a URI.

4. The method of claim 1, wherein the designated number of consecutive media segments to send is variable across communications in the media stream.

5. The method of claim 1, wherein the request from the client device specifies the designated number of consecutive media segments to send based on a battery or power level of the client device.

6. The method of claim 1, wherein the request from the client device specifies the designated number of consecutive media segments to send i-s based on a bitrate for the media stream.

7. The method of claim 1, wherein the request from the client device specifies the designated number of consecutive media segments to send i-s based on an amount of sub-stream switching in adaptive bitrate streaming.

8. The method of claim 1, wherein the request from the client device specifies the designated number of consecutive media segments to send i-s based on stability of bandwidth available to the client device.

9. The method of claim 1 further comprising pushing a plurality of segment sets in response to the request for the first media segment, each segment set of the plurality of segment sets comprising an additional media segment of the first sub-stream and an additional media segment of the second sub-stream that correspond to at least partially concurrent portions of the multimedia content.

10. The method of claim 9, wherein the plurality of segment sets are pushed in an order based on a sequence of the segment sets in the multimedia content.

11. A media streaming system comprising:
  a server configured to execute instructions stored in storage that when executed perform operations of processing a media stream comprising a video sub-stream dividing video of multimedia content into a set of sequential video segments and an audio sub-stream dividing audio of the multimedia content into a set of sequential audio segments that are separate from the sequential video segments, the operations comprising:
    receiving a hypertext transfer protocol (HTTP) request to stream a specifically designated video segment of the video, wherein the request specifies that the request is for multiple media segments without specifically designating identifiers for a subset of the multiple media segments; and sending, in the media stream, a plurality of sets of media segments, a first of the sets comprising the requested video segment and an associated audio segment of the audio segments, based on the HTTP request specifying the request is for multiple media segments, thereby avoiding a separate request for the multiple media segments.

12. The system of claim 11 further comprising:
a client device configured to execute instructions stored in storage that when executed perform operations comprising:
sending the HTTP request to stream the video segment;
receiving the video segment and the audio segment sent by the server; and
playing back the multimedia content using the received video segment and the received audio segment.

13. The system of claim 12, wherein the request specifies that the request is for multiple media segments by designating a starting media segment and at least one of an ending media segment or a number of consecutive sets of at least partially concurrent media segments to send.

14. The system of claim 11, wherein each set of the plurality of sets comprises an additional video segment of the video segments and an additional audio segment of the audio segments that correspond to at least partially concurrent portions of the multimedia content.

15. One or more computer storage media storing computer-useable instructions that, when used by one or more computing devices, cause the one or more computing devices to perform operations for streaming media, the operations comprising:
sending, by a client device in a media stream to a server, a request to stream a specified first media segment from the server, the first media segment being of a first sub-stream dividing a first portion of multimedia content into a first set of sequential segments, wherein the request does not specify a second media segment of a second sub-stream dividing a second portion of the multimedia content into a second set of sequential segments, wherein the first sub-stream is at least partially concurrent with, and of a different type of media than, the second sub-stream;
receiving, by the client device in the media stream, a designated number of sets of consecutive media segments, one of the sets comprising the requested first media segment and the second media segment, from the server in response to the request for the first media segment, the designated number provided to the server by the client device; and
playing back the multimedia content using the received first media segment and the received second media segment.

16. The one or more computer storage media of claim 15, the operations further comprising playing back the received first media segment and the received second media segment at least partially concurrently.

17. The one or more computer storage media of claim 15, wherein the sending and the receiving employ a stateless communication protocol.

18. The one or more computer storage media of claim 15, wherein each set of the designated number of sets comprises an additional media segment of the first sub-stream and an additional media segment of the second sub-stream that correspond to at least partially concurrent portions of the multimedia content.

19. The one or more computer storage media of claim 18, the operations further comprising receiving the designated number of sets in an order corresponding to a temporal sequence of the sets in the multimedia content.

20. The one or more computer storage media of claim 15, the operations further comprising providing the designated number to the server in a separate communication from the request.

* * * * *

UNITED STATES PATENT AND TRADEMARK OFFICE
CERTIFICATE OF CORRECTION

PATENT NO. : 10,880,357 B2  
APPLICATION NO. : 14/581916  
DATED : December 29, 2020  
INVENTOR(S) : Swaminathan et al.

Page 1 of 1

It is certified that error appears in the above-identified patent and that said Letters Patent is hereby corrected as shown below:

On the Title Page

In Column 2, item (56), Other Publications, Line 2, after "In" insert -- Multimedia --.

In Column 2, item (56), Other Publications, Line 4, after "IEEE." delete "Multimedia.".

In the Claims

In Column 18, Line 33, Claim 6, after "send" delete "i-s".

In Column 18, Line 37, Claim 7, after "send" delete "i-s".

In Column 18, Line 41, Claim 8, after "send" delete "i-s".

Signed and Sealed this  
Twenty-third Day of February, 2021

Drew Hirshfeld  
*Performing the Functions and Duties of the*  
*Under Secretary of Commerce for Intellectual Property and*  
*Director of the United States Patent and Trademark Office*